March 14, 1967

E. H. SHORT III 3,308,663

METERING SYSTEM FOR THE NET OIL PRODUCED FROM AN OIL WELL

Filed April 24, 1964

INVENTOR.
EDWARD H. SHORT III

BY Arthur L. Wade

ATTORNEY

March 14, 1967 E. H. SHORT III 3,308,663
METERING SYSTEM FOR THE NET OIL PRODUCED FROM AN OIL WELL
Filed April 24, 1964 3 Sheets-Sheet 3

INVENTOR.
EDWARD H. SHORT III
BY
ATTORNEY

United States Patent Office 3,308,663
Patented Mar. 14, 1967

3,308,663
METERING SYSTEM FOR THE NET OIL PRODUCED FROM AN OIL WELL
Edward H. Short III, Tulsa, Okla., assignor, by mesne assignments, to Combustion Engineering, Inc., a corporation of Delaware
Filed Apr. 24, 1964, Ser. No. 362,411
3 Claims. (Cl. 73—233)

This invention relates to a method and apparatus for determining the amount of water in an oil-water mixture. More particularly, it relates to a method and apparatus for making a water-cut determination of a crude oil mixture independently of the physical characteristics of the mixture.

Wells frequently produce varying amounts of water along with oil and gas. It is often necessary to determine how much of the produced fluid is water and how much is oil. When leases are consolidated, it becames a problem to given the individual leases proper credit for their production of the merchantable oil they produce. This determination is not only necessary for proper allocation of income, but may result from the requirements of State regulatory bodies.

Obviously, the amount of oil and water in the produced fluids can be separated and each fluid measured separately. However, this requires the use of expensive treating equipment which many individual leases cannot justify. It is a problem of long standing in this art to make this determination of oil and water production with inexpensive equipment. To be inexpensive, the equipment should avoid the elaboration of separating the oil from the water and measuring the volume of each to determine the water-cut.

It is not unusual to have various wells producing to a common point from different portions of the same reservoir, or from different reservoirs. As a result, the physical properties of the oil, such as density, vary from one well to another. Likewise, the water produced from the various wells may differ in density because of the variation in the dissolved solids contained in the water. In any system designed to measure water-cut by measuring the density of the produced fluids, these differences in the oil and water densities produced by various wells must be taken into account, otherwise errors will be introduced into the measurement.

At least U.S. Patents Hubby 2,958,223 and 3,009,359 disclose a method and apparatus for determining the water content of an oil-water mixture by storing the oil mixture in a vertical column and measuring the static pressure, or head, differential between the column of the mixture, a column of a representative sample of the oil and a column of a representative sample of the water. The present invention utilizes principles which are to be contrasted with the principles disclosed in these patents.

It is a principal object of the present invention to continuously meter the liquids produced by a well and manifest the volume of the water and volume of the oil of the liquids.

Another object is to maintain vertical columns of a mixture of the liquids produced, a representative sample of the water in the liquids and a representative sample of the water-free oil in the liquids in continuous connection to a mechanism which calculates and manifests the volumes of the water and oil of the liquids.

Another object is to continuously apply a plurality of forces to a system of levers and shift the contact between the levers to maintain a balance between forces developed on the levers in providing a position in space representative of a relation between the forces.

In accordance with the present invention, the liquids produced by a well are conducted through a column of predetermined height. Vertical columns in which representative samples of the water phase and the oil phase of the mixture are maintained are established at the predetermined height. The differential in weight between the three columns is then continuously applied to a lever system to develop an output relay signal which shifts the contact point between the levers to maintain a balance of the forces developed on the levers and thereby provide a position in space representative of the ratio of oil and water in the mixture.

Other objects, advantages and features of this invention will become apparent to one skilled in the art upon consideration of the written specification, appended claims, and attached drawings, wherein;

*Introduction*

As more leases are consolidated, the need for determining how much oil is produced from each lease becomes greater. Each lease owner is financially interested in his oil production, and the production of others in the consolidation. The distribution of income within the consolidation is based on the net amount of oil contributed by each lease and accurate determination of this basis for income is a serious matter. The present invention is an important advance in getting equipment to each lease which will efficiently determine the net oil in the mixture of oil and water produced with economy and simplicity under the abuse field equipment is generally given.

As the inventor, I see the continuous flowing method of measurement as more simple than the intermittent dumping method of measurement. Superficially, the filling and dumping of a container of well liquids appear subject to less error than the so-called positive displacement meter. However, the extraction of the indication of the net oil (or net water) from the dump readings inherently requires more reciprocating movement of mechanical parts in such a way as to introduce progressive errors of various types. Additionally, progressive incrustation is always a threat to accuracy in the use of containers for measuring. True, the positive displacement meter continually turns and wears; however, basic improvement on these mechanisms has steadily increased their accuracy and life until they have gained wide acceptance in the oil field for volumetric measurement.

The rotation of the positive displacement meter can be readily clutched to a register, or recorder, and the clutch controlled by a simple force-balance relay which is made to respond to the net oil in the mixture passing through the positive displacement meter. The moving parts of the relay travel over relatively small ranges of movement to respond accurately to the net oil in the metered mixture. Further, all parts of the relay can easily be made rugged enough to withstand the abuse of field service without sacrifice of accuracy. The manifestation of the combination of relay, clutch and positive displacement meter becomes a continuous reading as the well production flows through the apparatus, with far less motion than necessary in the intermittent dump mechanism.

*General arrangement*

Figure 1:
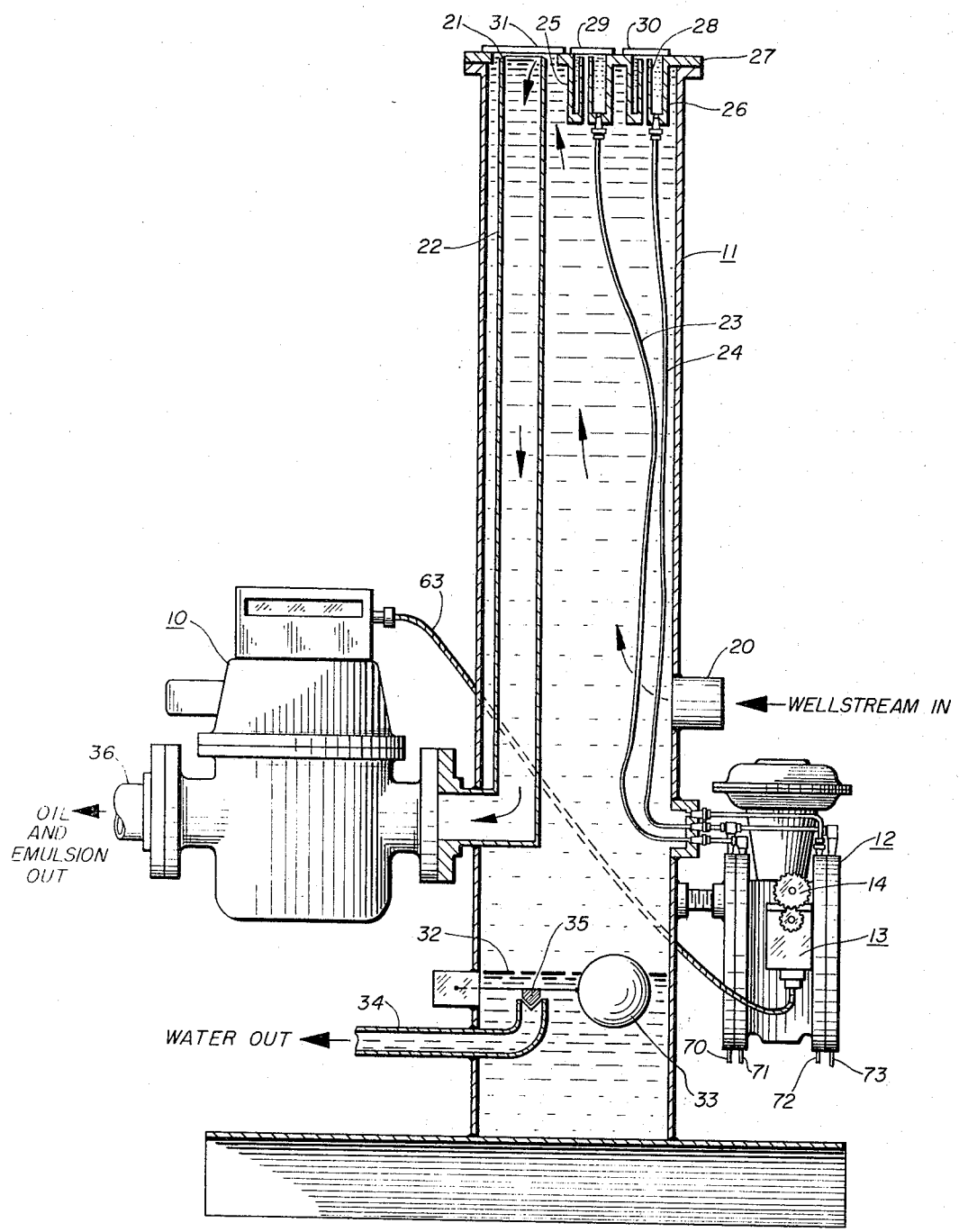
FIG. 1 is a partially sectioned elevation of a general assembly of a metering unit embodying my present invention.

Referring to FIG. 1 of the drawings, I show the basic arrangement of a positive displacement meter, measuring columns and mechanism which receives the static pressure output of the columns to control the clutch between the register and positive displacement meter. The positive displacement meter is generally designated at 10. All the columns are within casing 11. The columns are connected to a relay 12. The positions in space, which is the output of relay 12, are used to adjust clutch-integrator 13. Integrator 13 is also connected to meter 10 to take its output and apply it to counter 14 as dictated by the relay output. The result is a manifestation by register-counter 14 of that portion of the output of meter 10 which represents the water, or oil, in the mixture of these liquids flowing through meter 10. The relay output which controls this result is continuous representation of a computation of the weight differences between the columns within 11.

Columns

The first of the three columns to be considered is that containing the mixture of oil and water. Shell 11 is vertically extended to give a height for this column which will provide a weight great enough to be effective in relay 12. The well production is taken into shell 11 at inlet 20 and flows up the column to spill over the weir 21 provided at the top end of conduit 22 which is mounted vertically within shell 11.

It is within the scope of my invention to provide the equivalent of weir 21 by other arrangements. Conduit 22 could be extended on the outside of shell 11, up to a small skimmer structure inside shell 11. In any of the various arrangements available, a column of finite vertical length is provided for the mixture to flow through continuously to the meter 10.

Meter 10 is connected to conduit 22, receiving the total liquids passed through column 11. The movement of the rotating element of meter 10 is then transmitted to clutch-integrator 13 to be reduced to the desired output to counter 14.

The second and third columns are, essentially, relatively small pipes 23 and 24 extending vertically within shell 11 to establish a level for their liquids at substantially the height of the mixture column. The bores for pipes 23 and 24 may be selected from a wide range. Once filled, there will be substantially no flow through these pipes.

It is necessary that all the columns be maintained at substantially the same level. Only then will their weight differences be accurate representations of their compositions. The reservoirs I have provided on the upper ends of pipes 23 and 24 insure stability of the levels of pipes 23 and 24.

Each of reservoir cups 25 and 26 are fixed to the cover 27 of casing 11 and are connected to pipe 23 or pipe 24. Take reservoir 26, for example; pipe 24 opens into its bottom while its top is open to the upper surface of cover 27. Riser pipe 28 extends from the bottom of reservoir cup 26 up to the elevation of weir 21 of the conduit 22. Fluid forced up pipe 24 will fill reservoir cup 26 up to the top of riser 28 and overflow back into casing 11. The same is true for reservoir cup 25. Therefore, all three columns are given substantially the same height, their differences in weight being dependent upon their static pressure differences due to density differences.

By placing pipes 23 and 24 within casing 11, temperature differences between the liquids are minimized by heat exchange. Also the volume provided by the reservoir cups tends to militate against large changes in elevation of the liquids within pipes 23 and 24.

The location of reservoir cups on cover 27 also provides visual inspection of the internals of the cups. Transparent windows 29 and 30 are provided over the holes in cover 27 and the levels may be observed to determine if the column liquids are at their proper levels. A similar observation window 31 is also provided for weir 21.

As a column, it is necessary that casing 11 not have a static accumulation of water in the effective length of the casing as a column. Therefore, any free water in the production that settles against the upward flow must be removed from the vertical length of this column so that the weight comparison with the other columns will be accurate. In short, if free water drops to the bottom of casing 11 it must have its level maintained below the effective height of the column.

The free water which drops from the well production coming into shell 11, through inlet 20, has its level indicated at 32. A float 33 is constructed to float on this interface with the water below and the emulsion above level 32. Conduit 34 is arranged to remove water from this collection in the bottom of shell 11 as fast as it collects from the incoming stream of production. Many specific forms of controls can be used. A very simple valve arrangement is indicated at 35, controlled by float 33. As float 33 is raised by the accumulating water, valve 35 is opened so that a corresponding amount of water is discharged through pipe 34 to maintain the level 32 at a constant height.

The emulsion above level 32 then has a normal flow path over weir 21, down conduit 22, through meter 10 and out conduit 36. The production can then be co-mingled with other production in its consolidation for central treatment, its net oil content having been obtained.

All three columns are connected to relay 12 through terminals mounted in the wall of shell 11. The height of the columns from the relay diaphragms is sufficient to provide the head force necessary to actuate relay 12 to determine the calculated position in space which will control the register 14 for the desired read-out value of net oil (or water).

Relay 12

Figure 2:
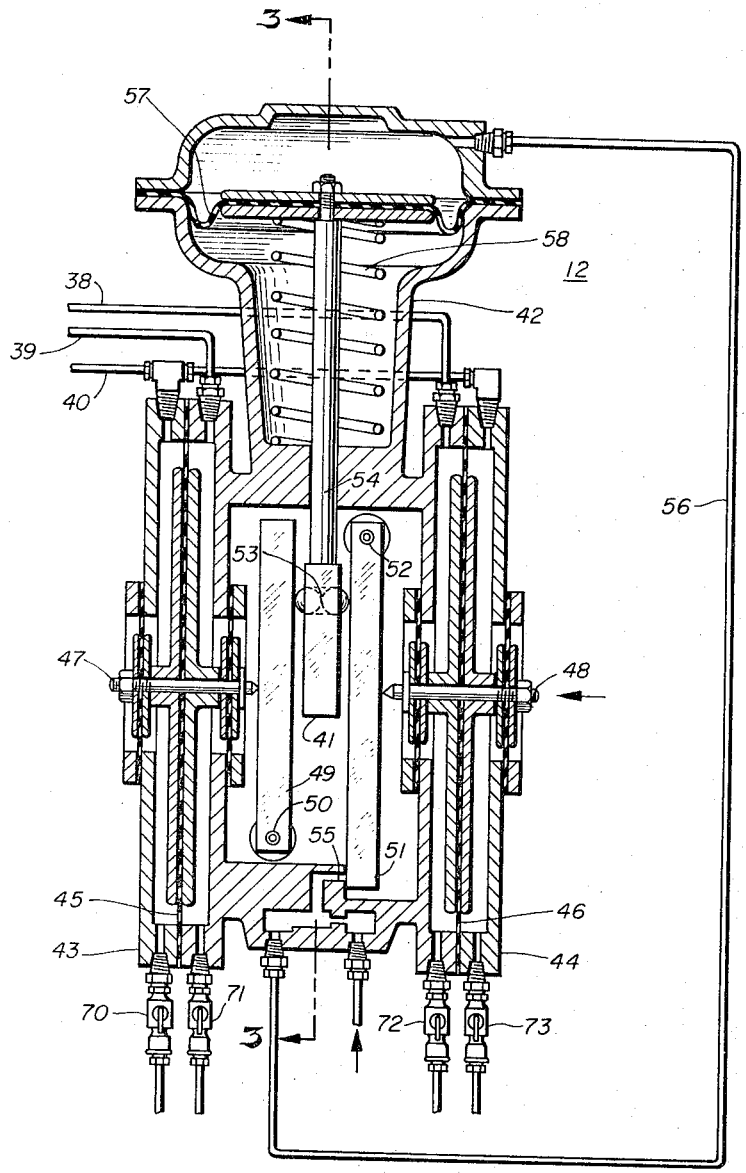
FIG. 2 is a sectioned elevation of the relay of the meter of FIG. 1 as it responds to the weights of the samples in their columns and establishes positions in space as an output.
Figure 3:
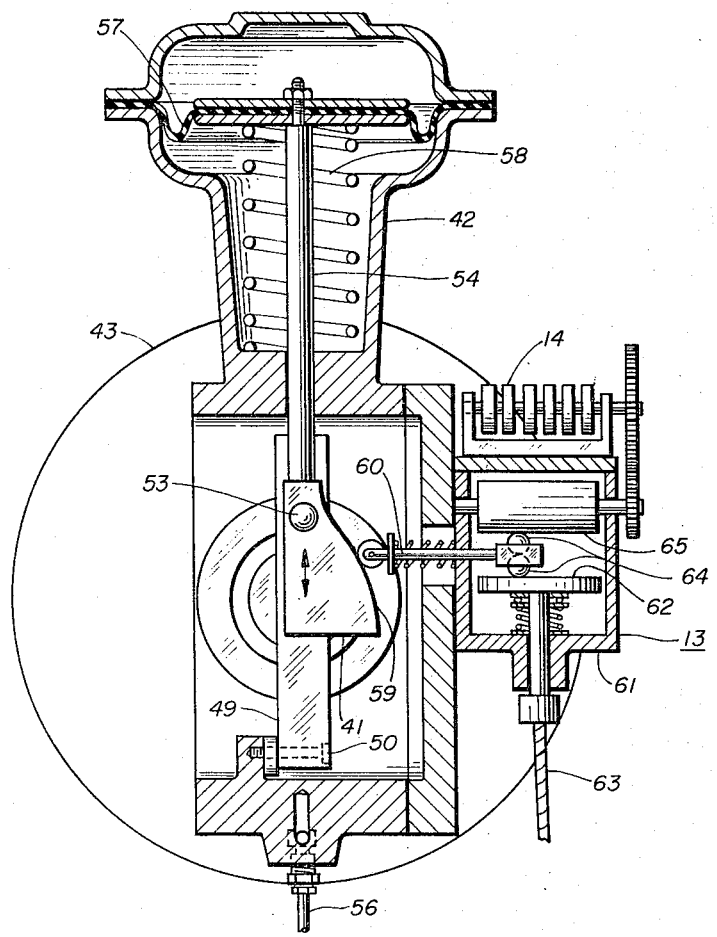
FIG. 3 is a sectioned elevation along lines 3—3 of FIG. 2 showing how the relay positions the clutch which links the positive displacement meter and register.

The three columns are connected to relay 12 by pipes 38, 39 and 40. Both FIG. 2 and FIG. 3 are to be considered to appreciate the arrangement of relay 12, its connection to the columns and its connection to the integrator-clutch 13.

The terminal function of relay 12 is to position cam 41 in space as dictated by the weights of the columns at any one time. This motion is generated in a servo system which transduces the weight forces of the columns into mechanical motion of a level system, then into a fluid pressure force of a fluid pressure couple connected to the lever system and then back to a mechanical motion which simultaneously shifts a contact point in the lever system and the position of cam 41 until the lever system comes to a stable condition under the forces placed upon it by the columns. Cam 41 is connected to clutch-integrator 13 to control the linkage between meter 10 and register 14 as heretofore explained.

Relay 12 is built up around a body framework 42. All the moving parts of the relay mechanism move with respect to this stable reference structure. Referring specifically to FIG. 2, this sectioned view shows diaphragm casings 43 and 44 mounted to contain diaphragms 45 and 46 in parallel planes.

Diaphragms 45, 46 have the conventional central stiffener plates which mount sealing diaphragms which enable the motion of the diaphragms 45, 46 to be transmitted outside their casings with little or no friction. Central pins 47, 48 are the elements moved along axes normal to their diaphragms in transduction of the fluid pressure placed on the diaphragms. Pins 47, 48 each bear on levers of a system which actuates a fluid pressure pilot couple. To develop the forces with which pins 47, 48 move against their levers, diaphragms 45 and 46 have each of their sides subjected to the fluid pressures developed by the columns.

The three columns each have a different weight of liquid. In this particular embodiment of the invention, column 24 is filled with the heavier liquid, water, and is connected to the outside chamber of both casing 43 and casing 44. Both pins 47 and 48 will then be forced inward, onto the lever system.

The force exerted by water on the diaphragms 45, 46 are then opposed by the lesser forces of the oil column and the column containing a mixture of oil and water. The embodiment shown places the oil on diaphragm 45 and the mixture on diaphragm 46. Therefore, pin 47 will be forced to the right with a force greater than that with which pin 48 is forced to the left for so long as diaphragm 46 has the force of a mixture of oil and water placed on it.

The lever system receiving the forces of pins 47, 48 comprises two levers pivoted from their ends and a movable contact point between the levers. The forces of pins 47, 48 are applied at fixed locations on the levers. The movable contact is then shifted to change the mechanical advantage of one of the levers with respect to the other so the levers will be returned to their original position. This action characterizes the relay as being a true force-balance type, returning its levers to substantially their predetermined position after receiving a change in forces.

Specifically, pin 47 bears against lever 49, pivoted at 50. Pin 48 then bears against lever 51, pivoted at 52. Between the two levers, two balls 53 are supported on a shaft 54 which reciprocates vertically. The balls 53 then become a low-friction, movable contact between the levers with which the mechanical advantage of each lever with respect to the other is altered to return the system to its original position.

Changes in the position of the system of levers are sensed by a fluid pressure couple, one-half of which is connected to the free end of lever 51. Essentially a fluid pressure couple is formed by supplying a pilot gas to an orifice 55 in the frame 42 and controlling discharge of the gas by moving the free end of lever 51 over the orifice. The back pressure varied in this manner is conducted by pipe 56 and applied to the top of motor diaphragm 57. As diaphragm 57 is attached to shaft 54 to move the shaft against the pressure of spring 58, the relay system is completed. Any change in the forces on diaphragms 45, 46 moves the levers 49, 51 which develops a change in the fluid pressure of pipe 56 which acts through diaphragm 57 to shift the contact point 53 to return the levers 49, 51 to their original positions. The terminal condition is a range of positions for shaft 54—cam 41 can be used to vary the connection between meter 10 and register 14 so the reading of register 14 will be in terms of net oil (or water).

Integrator-clutch 13

The vertical motion, and position of shaft 54 is given a desirable characteristic by profiling cam 41. This profile 59 positions a shaft 60 which is a part of integrator 13.

In principle, integrator 13 is quite simple. A frame 61 supports a disc 62 which is turned by meter 10 through cable 63. Balls 64 are turned by disc 62 and these balls, in turn, rotate cylinder 65. As shaft 60 moves the balls 64 further from the center of disc 62 rotation, cylinder 65 is caused to rotate faster. Therefore, this arrangement provides a variable coupling between the rotating cable 63 and rotated cylinder 65. Simple gearing between cylinder 65 and register 14 complete the means by which the desired manifestation is acquired.

Filling the columns

The second and third columns, essentially pipes 23 and 24, are filled with water and oil representative of the water and oil of the well production received by the device. The production itself can be treated, i.e., separated into water and oil. These fluids are then introduced into tubes 23 and 24.

FIG. 2 shows a convenient provision for flowing the oil and water up into the columns. Hand cocks 70, 71 and 73 are opened and the liquids forced up pipes 23 and 24 until the riser pipes in reservoirs 25 and 26 overflow. Windows 29 and 30 are used to visually observe that the columns are properly filled. As shown in FIG. 1 pipe 24 is filled with the water and pipe 23 is filled with the oil. Hand cock 72 is employed to force the metered liquid into the inside chamber next to diaphragm 46.

Diaphragm operation

With all sides of the diaphragms subjected to the liquids, the relay is activated to position cam 41. As observed in FIG. 2, the water column is connected to the outsides of both diaphragms, the clean oil column is connected to the inside of diaphragm 45 and the metered liquid is connected to the inside of diaphragm 46. Therefore, the pin 47 will be pushed to the right with less force than pin 48 is pushed to the left. The moment arm from pivot 50 to balls 53 must then be larger than the moment arm from pivot 52 to balls 53 to balance the force on lever 49 against the force on lever 51.

Any change in the balance of forces on the lever system results in relative movement between the orifice 55 and the end of lever 51. Changes in the value of the output of this fluid pressure couple are applied through pipe 56 to the top of diaphragm 57. Shaft 54 is then moved to position balls 53 until a balance of moments on the levers 49 and 51 is regained.

Alternate diaphragm connection

It is possible to connect the clean oil column to the insides of the diaphragm. The water columns could then be connected to the outside of one diaphragm and the metered liquid to the outside of the other diaphragm. The levers are then balanced in the same manner, by movement of the balls 53. The cam 41 is then shaped to position the balls 64 to read out the net oil in the liquids metered.

From the foregoing it will be seen that this invention is one well adapted to attain all of the ends and objects herein above set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. An apparatus for determining the water content of an oil-water mixture comprising,
   means for flowing the entire oil-water mixture in a vertical conduit up to a predetermined height,
   means for providing a sample of a clean oil phase and a sample of a water phase, each representative of the oil and water in the mixture,
   means to establish the sample of the oil phase in a column with substantially the predetermined height of the water-oil mixture in the vertical conduit,
   means to measure the density difference between the oil phase sample and the entire mixture by their differential at the predetermined height,
   means to establish the sample of the water phase in a column with substantially the predetermined height of the oil-water mixture in the vertical conduit,
   means to measure the density difference between the water phase sample and the oil phase sample by their differential at the predetermined height,
   a positive displacement meter to measure the flowing quantity of the oil-water mixture in the vertical column,
   and means for continuously compensating the measurement of the flowing quantity of the oil-water mixture by the means measuring the density differences to determine the water cut.

2. An apparatus for determining the water content of an oil-water mixture comprising,
- a vessel vertically extended with an inlet connected to an oil-water mixture supply and arranged to maintain the mixture flowing through the vessel up to a predetermined height within the vessel,
- a positive displacement meter connected to the outlet of the vessel to receive the mixture of oil and water flowing through the vessel and indicate the flowing quantity of the oil-water mixture passing through the vessel,
- a column mounted in the vessel with a sample of the oil of the mixture filling the column up to the predetermined height of the mixture,
- a column mounted in the vessel with a sample of the water of the mixture filling the column to the predetermined height of the mixture,
- a fluid pressure relay connected to the vessel and the oil column and the water column at a substantially common point below the predetermined height to continuously compare the difference in densities of the three liquids and position a member within a range of movement for each relation of the densities,
- and a register connected to the meter and the relay member to indicate the flowing quantity of oil passed through the meter.

3. The apparatus of claim 2 in which the relay includes;
- a first lever pivoted from a first end,
- a second lever arranged substantially parallel the first lever and pivoted from the second end of the combination of levers,
- a contact point arranged between the two levers and movable along their lengths,
- a fluid-pressure relay actuated by one of the levers when forces on the levers are unbalanced and establishing an output fluid pressure connected to position the contact point to bring forces on the levers into balance,
- a first diaphragm attached to the first lever and connected to the water column on one side and the oil column on the other side at the common point to exert the force of their difference in densities on the first lever,
- and a second diaphragm attached to the second lever and connected to the oil column on one side and the mixture on the other side at the common point to exert the force of their difference in densities on the second lever;
- and a cam as the member is connected between the contact point and the register and the meter so as to actuate the register into indicating the net flowing quantity of oil passed through the meter.

References Cited by the Examiner
UNITED STATES PATENTS

| | | | |
|---|---|---|---|
| 1,881,572 | 10/1932 | Herz | 73—233 |
| 3,009,359 | 11/1961 | Hubby | 73—53 X |
| 3,045,983 | 7/1962 | Best | 137—85 X |
| 3,072,326 | 1/1963 | Rohmann et al. | 137—86 X |
| 3,081,636 | 3/1963 | Hubby. | |
| 3,087,469 | 4/1963 | Evans | 137—85 |
| 3,233,448 | 2/1966 | Brown | 73—233 X |

RICHARD C. QUEISSER, *Primary Examiner.*

E. D. GILHOOLY, *Assistant Examiner.*